United States Patent [19]
Dykes et al.

[11] 3,925,959
[45] Dec. 16, 1975

[54] TETRAHEDRAL PACKAGING MEANS AND METHOD OF MAKING SAME

[75] Inventors: Ralph E. Dykes, White Plains, N.Y.; Robert M. Mitchell, South Norwalk, Conn.

[73] Assignee: General Foods Corporation, White Plains, N.Y.

[22] Filed: Dec. 6, 1971

[21] Appl. No.: 205,433

Related U.S. Application Data

[62] Division of Ser. No. 683,047, Sept. 22, 1967, which is a division of Ser. No. 420,646, Dec. 23, 1964, Pat. No. 3,347,363.

[52] U.S. Cl. ........................................ 53/28; 53/180
[51] Int. Cl.² ............................................ B65B 9/08
[58] Field of Search .......... 53/28, 180, 182; 206/65; 229/22

[56] References Cited
UNITED STATES PATENTS

| | | | |
|---|---|---|---|
| 2,738,631 | 3/1956 | Jarund | 53/180 |
| 2,966,021 | 12/1960 | Lane et al. | 53/182 |
| D199,935 | 12/1964 | Dykes et al. | 229/22 X |

*Primary Examiner*—Roy Lake
*Assistant Examiner*—E. F. Desmond
*Attorney, Agent, or Firm*—Bruno P. Struzzi; Thomas V. Sullivan; C. Garman Hubbard

[57] ABSTRACT

Individual irregular tetrahedral units are formed from packaging material supplied in roll form and drawn around a hollow filling mandrel to form an elongate, continuous tube which is then sealed by sealing jaws operating at spaced increments axially of the tube. Each sealing operation forms the top seal of one tetrahedral unit and the bottom seal of another, and the tubular material is subsequently cut along approximately the median line of each seam. The sealing jaws are also positioned so as to intersect the axis of the tube at pre-determined oblique angles to thus form individual tetrahedral units each face of which is a right triangle and which thus can be compactly nested without voids within a conventional triangular or rectangular carton.

10 Claims, 22 Drawing Figures

TETRAHEDRAL PACKAGING MEANS AND METHOD OF MAKING SAME

This application is a divisional application based on prior application Ser. No. 683,047, filed Sept. 22, 1967, which prior application is a division of parent application Ser. No. 420,646, filed Dec. 23, 1964, which parent application issued on Oct. 17, 1967, as U.S. Pat. No. 3,347,363.

This invention relates generally to containers, the method of making same, and packages comprised of a plurality thereof, said containers being adapted for the packaging of liquid, pulverized, plastic, or any semi-solid or free flowing material, which may be food products of various types, the invention relating more particularly to the packaging of said material in containers assuming the general form of a tetrahedron.

Containers in the form of a tetrahedron have now come into common usage due to certain advantages inherent therein. It has been found that containers of this type utilize a minimum amount of packaging material in relation to the quantity of the contents contained thereby, render themselves readily adapted to mechanized manufacturing and filling techniques, have sufficient structural rigidity to maintain their tetrahedral shape when partially or even completely emptied of their contents, and are generally economical to manufacture.

There is, however, a major disadvantage inherent in the tetrahedral shape of a container when employed as a packaging means. The disadvantage resides in the fact that the shape of a regular tetrahedron, i.e., an orthogonal tetrahedron, which is a type of tetrahedral container now in common usage, does not permit the assembly of several containers thus shaped into a compact and closely nested configuration and thereby precludes suitable multipacking thereof for shipping or storage purposes in accordance with conventional package forms. For example, a regular or orthogonal tetrahedron presents a body having four sides or faces, each in the shape of an oblique angled triangle, each containing the same area and lying in its own respective plane, no two faces being in a plane parallel with each other. Due to the diverse planes in which the four faces of the regular tetrahedron lie and the obliquely angled nature of the respective triangular faces, the multiple packing of such containers into a compact package of suitable shape for shipment and storage purposes, and without loss of space between the individual containers, has been unattainable. The ideal shape for an assemblage or a package of containers is of course that of a cube or rectangular prism which enables a plurality of packages to be stacked in close compact relationship one to another, so as to occupy a minimum of space for shipping and storage purposes. In the case of regular tetrahedral containers, various shaped packages have been proposed, none of which, however, encloses the individual containers without substantial void space therebetween or in itself possesses a shape which enables it to be bundled together with a plurality of other packages of like shape into an assembled bundle of simple geometric form without a considerable amount of wasted space existing between the several packages.

The present invention overcomes the above difficulties by providing a container in the shape of an irregular tetrahedron which has its faces so proportioned as to enable a plurality of such containers to be assembled together in a closely compacted and nested form, completely filling the cubic area of a simple geometric body without waste space existing between the several containers thus assembled. The tetrahedral shape of a container in accordance with the present invention is one wherein each of the four faces of the container represents a right triangle, two adjoining faces which have a leg in common being similar right triangles of the same area, and two adjoining faces which have their hypotenuse in common also being similar right triangles of equal area. When formed in this manner, four such containers, it has been found, will fit in a compact nested arrangement within the confines of a rectangular prism, the dimensions of which correspond to the length of the legs of the respective triangular faces. When the tetrahedral form is of a shape wherein the triangular equal area faces which have a leg in common are isosceles triangles, six of said units will fit in a closely compact nested form within the confines of a cube, completely filling the cubic area without waste space between the several containers thus assembled. It will be apparent that by forming the containers in this manner the multiple packing thereof into assembled packages is greatly facilitated and is accomplished without loss of space, thereby overcoming difficulties surrounding the use of containers formed in a regular tetrahedral contour.

One method of forming tetrahedral containers is by transversely sealing web material preformed into an elongated continuous tube, the sealing means operating in spaced increments axially of the tube to produce successive sealed edges which alternately lie in planes at right angles to each other, it being understood of course that the container is filled before the top edge is sealed, after which the tube of material is severed at each seal to provide individual containers of a tetrahedral shape. If each seal running transversely of the tubular stock extends along a seam line which intersects and is also normal to the axis of the tube, the resultant tetrahedral container will be one in which all four faces thereof are similar and of the same area. Depending upon the axial spacing between the respective successive seals, the four faces of the tetrahedron thus fabricated constitute either equilateral, or isosceles triangles. Tetrahedral containers thus formed are of the regular or orthogonal type and for that reason do not lend themselves readily to multipacking without an excessive amount of wasted space, as heretofore mentioned.

It has been found that if the sealing means are so oriented that instead of producing a seam extending along a seam line normal to the axis of the tube, they produce a seam which extends along a seam line intersecting the axis of the tube at an oblique angle relative to the axis of the tube, the resulting tetrahedron will be irregular, i.e., having faces which are dissimilar. If, however, the sealing means is so oriented as to produce seams extending along lines at a predetermined oblique angle relative to the axis of the tube, and the spacing between successive seams is of a predetermined extent, the resultant tetrahedron will be one in which each face thereof represents a right triangle. A tetrahedron thus formed so as to have each face in the form of a right triangle is adaptable for nesting assembly within the confines of a triangular or a rectangular prism. In fabricating tetrahedral shapes of this latter type, the angle by which the seam line deviates from normal relative to the axis of the tube depends upon the spacing of the seams along the axis of the tube together with the diameter of the tube. When the diameter of the tube is such that, when the tube is collapsed to form a seam, the length of the seam represents a distance approximately four-fifths of the distance at which the successive seams are axially spaced at their center line, and when the angle by which each seam line deviates from normal relative to the axis of the tube is approximately 24°, the resultant tetrahedrons will be ones which will fit in nested compact relationship within the confines of a cube.

In fabricating tetrahedral containers of this latter type, a first seam may be made in a first plane common to the axis of the tube and along a seam line intersecting the axis of the tube at an approximately 24° angular deviation from normal relative to the tube axis; a second seam may be made at the predetermined axially spaced interval within a second plane common with the tube axis and perpendicular to said first plane, said second seam extending along a seam line deviating from normal relative to the tube's axis by approximately 24°; a third seam may be made at the predetermined spaced interval along the tube's axis from the second seam within the plane of the first seam and along a seam line deviating from normal relative to the tube's axis by the 180° complement of the deviation of said first seam, i.e., by approximately 156°; a fourth seam may be made at the proper spaced interval axially of the tube within the plane of the second seam and along a seam line deviating from normal relative to the tube axis by the 180° complement of the second seam line deviation, i.e., by approximately 156°. The making of four tetrahedral containers in the above stated manner will consume a standard increment or section of the tubular stock, enabling the process to be repeated and thereby permitting continuous fabrication of the containers from an elongated continuous length of tubular stock without loss of any stock material.

It has also been found that by altering the angular deviation of the seam line from normal relative to the axis of the tubular stock to a 180° complemental deviation, a symmetrical tetrahedral shape representing the mirror image of the shape which is produced without such alteration is achieved. When two identical tetrahedral containers fabricated in accordance with the above stated specifications are combined with a single symmetrical tetrahedral container representing the mirror image thereof, the three containers will fit in compact nested assembly within the confines of a triangular prism. Accordingly, when two such triangular prisms are assembled together the resulting package will be that of a cube consisting of four identical tetrahedral containers and two mirror images thereof, i.e., symmetrical containers. It will thus be apparent that forming the tetrahedral containers in an irregular tetrahedral shape in the manner above described will result in individual tetrahedral shapes which lend themselves to multipacking without loss of any space therebetween and thereby avoiding a major disadvantage inherent in the use of the conventional regular tetrahedral shapes for container purposes.

It is, therefore, an object of this invention to improve upon tetrahedral containers by providing them with a shape better suited for multipacking.

It is another object of the invention to provide an improved container in an irregular tetrahedral shape which enables a plurality of such containers to be closely nested together in flush abutting relationship within an assembled package thereof.

Still another object of the invention is to provide tetrahedral containers with an irregular tetrahedral shape enabling a plurality thereof to be assembled within and completely fill the area of a cube. A still further object of the invention is to provide an improved container of irrgular tetrahedral shape wherein each face of the container assumes the form of a right triangle.

Another object of the invention is to provide an improved package of a plurality of tetrahedral shaped containers arranged in a compact and closely nested assembly.

A still further object of the invention is to improve upon the method for fabricating tetrahedral shaped containers.

An additional object of the invention is to provide a method for fabricating containers possessing an irregular tetrahedral shape.

Additional objects of the invention, together with the features contributing thereto and advantages accruing therefrom, will be apparent from the following description when read in conjunction with the drawings wherein.

Referring now to drawings and in particular to FIGS. 1-6, it will be seen that the individual basic container unit 10 of the instant invention is in the general form of an irregular tetrahedron. The basic container unit 10 can be made out of any suitable packaging material such as paper, paperboard, metal foil or the like, the choice of material being dictated in part by the nature of the product to be contained thereby. Preferably the packaging material, at least on its inner surface, includes a lamina or coating of a heat-sealable or pressure-responsive adhesive substance which facilitates the construction and sealing of the container by enabling opposite interior surfaces of the packaging material to form sealed seams 11, 12 constituting two of the edges of the container in accordance with the method of construction to be hereinafter more fully described. In referring to the container as having a tetrahedral shape, it should be understood that the term "tetrahedral" is intended to denote the general configuration of the container since, due to the method of construction, hereinafter more fully explained, the packaging material is drawn into the general configuration of a tetrahedron in such a manner that the edges thereof, other than those defined by the seams 11, 12, are sharply arcuate fold lines rather than the actual dihedral angles of a true tetrahedron. Also, the amount of the packaging material incorporated in the sealed edges 11, 12 adds a structural feature to the container which is not a characteristic of a true tetrahedron, although the inner line of the surfaces thus sealed does represent an edge or dihedral angle which is characteristic of a true tetrahedron.

Figures 1, 3:
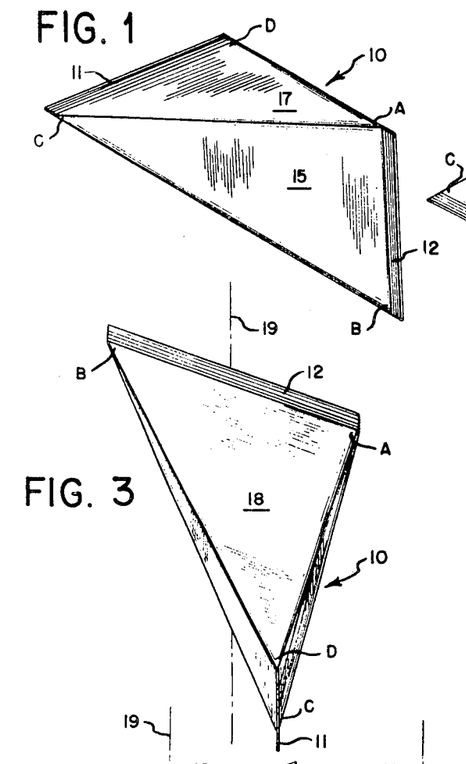
FIG. 1 is a perspective view of a container according to the within invention.
FIG. 3 is an elevational view of said container.
Figures 2, 4:
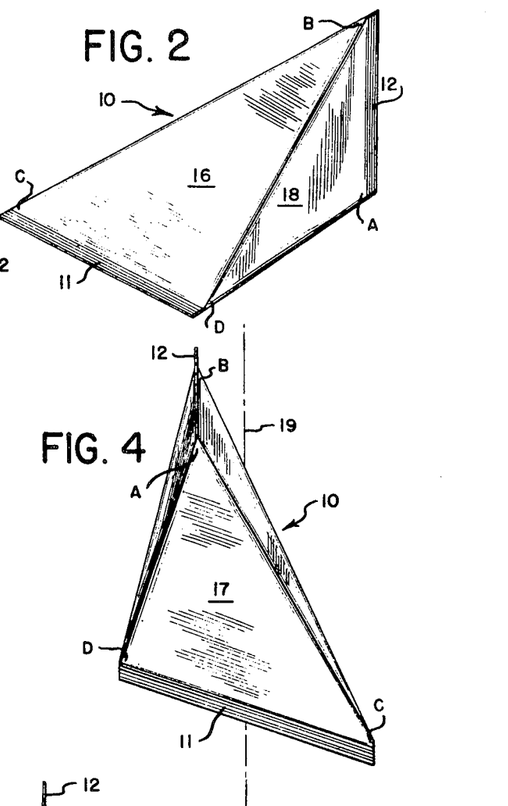
FIG. 2 is a perspective view of said container at a different angle from that of FIG. 1.
FIG. 4 is an elevational view of said container when rotated about a vertical axis 90° clockwise from the position shown in FIG. 3.
Figures 5, 6:
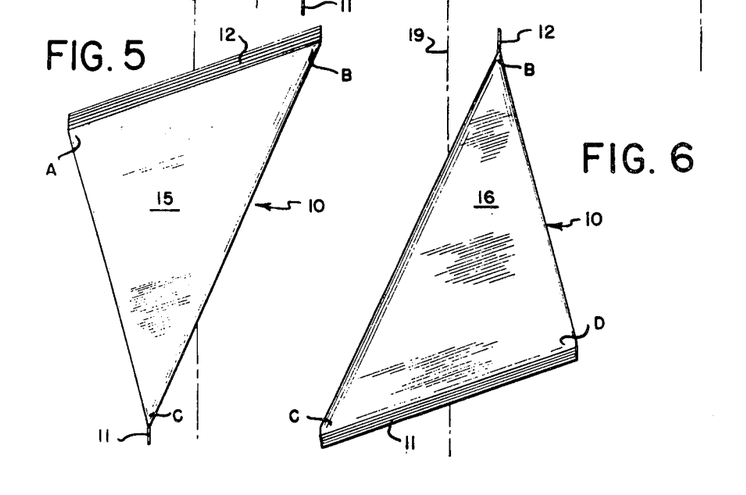
FIG. 5 is an elevational view of said container when rotated 90° clockwise from the positions thereof shown in FIG. 4.
FIG. 6 is an elevational view of said container when rotated 90° clockwise from the position thereof shown in FIG. 5.
Figures 7, 8, 9, 10:
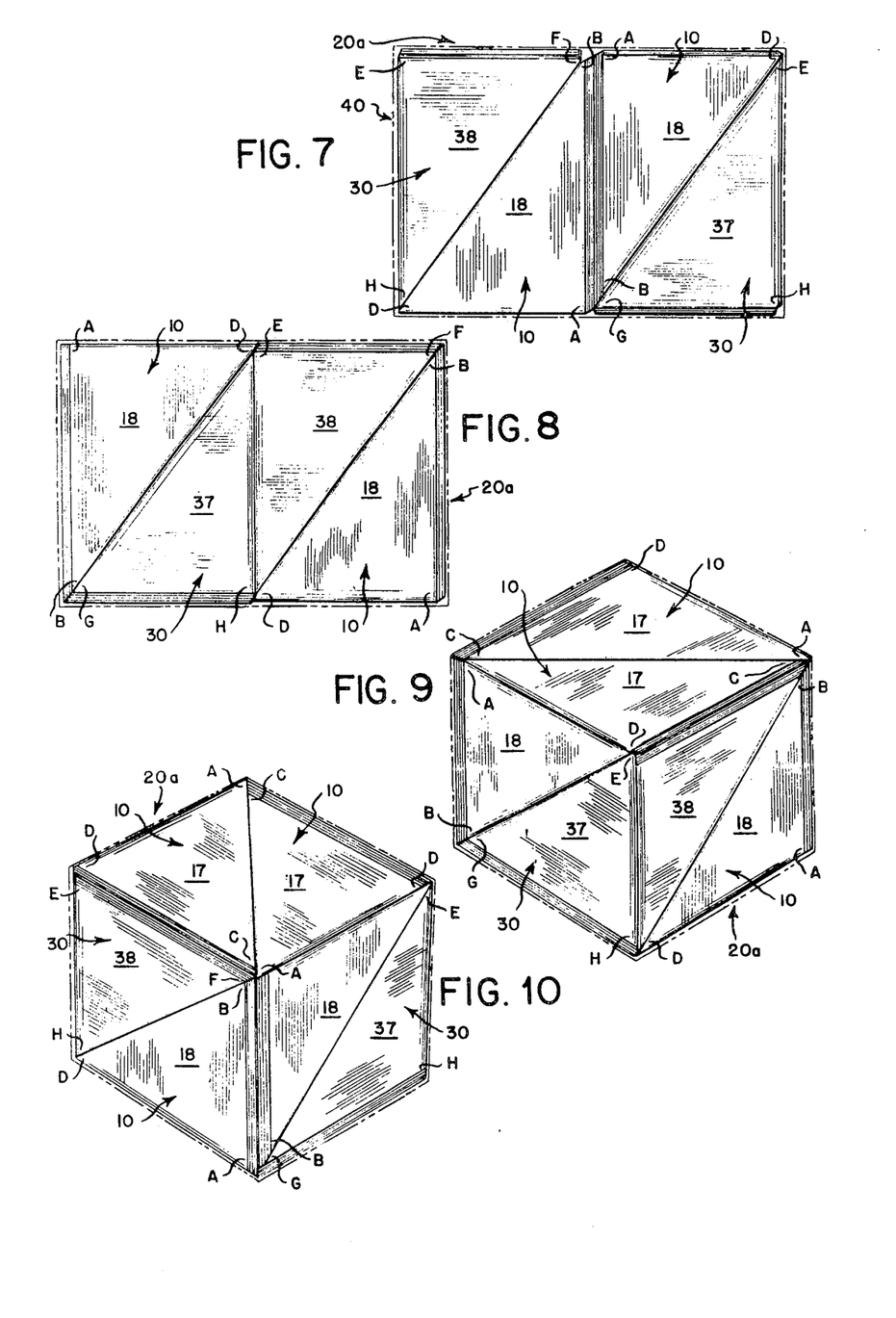
FIG. 7 is an elevational view of an assembled package of containers according to the within invention.
FIG. 8 is an elevational view of said package when rotated about a vertical axis 90° from the position thereof shown in FIG. 7.
FIG. 9 is a top perspective view of said package in the same position as in FIG. 8.
FIG. 10 is a top perspective view of said package when rotated 90° from the position thereof shown in FIG. 9 and being in the same position as in FIG. 7.

Considered in the light of the foregoing minor discrepancies from a true geometric tetrahedron, the container will be seen to include four vertices A, B, C, D, each constituting a trihedral angle and jointly defining the four triangular faces 15, 16, 17 and 18. with respect to FIGS. 1 and 2, it should be understood that FIG. 2 is a perspective view similar to FIG. 1 after the container edge AB has been inverted 180° from its position shown in FIG. 1.

The tetrahedral shape of the container 10 is one having an irregularity such that each of the four faces 15, 16, 17 and 18 constitute right triangles. This is accomplished by sealing the edges 11, 12 in such a manner that the lines of sealing or sealing axes, AB and CD, extend at a predetermined angle of inclination to the longitudinal axis of the tubular packaging material from which they are formed, as will be hereinafter more fully explained in conjunction with the method of constucting and sealing the containers. In the case of the container embodiments illustrated in FIGS. 1-6, the right angle of face 15 is the angle CAB, the hypotenuse of the right triangular face 15 being the edge CB. The right angle of face 17 is angle CDA, the hypotenuse thereof being line CA. The right angle of the triangular face 16 is angle BDC, the hypotenuse thereof being edge BC. The right angle of the triangular face 18 is angle BAD, the hypotenuse thereof being edge BD. The irregular tetrahedral shape illustrated in FIGS. 1-6 is further characterized by the fact that faces 15, 16 are of equal area and have a common hypotenuse defined by the edge BC. The hypotenuse of face 17, i.e., edge AC, also constitutes one leg of the face 15, while the hypotenuse of face 18, i.e., edge BD, constitutes one leg of the face 16, so that faces 15, 16 are necessarily of greater area than faces 17, 18, respectively.

A further characteristic of the tetrahedral shape of the containers 10 illustrated in FIGS. 1-6 is that edges AB, CD, and AD are of equal length, thus rendering the faces 17, 18 isosceles triangles. This results in the faces 15, 16 being right triangles of unequal sides or legs with the acute angle ABC being approximately two-thirds as great as the acute angle ABC, as to face 15, and similarly, the acute angle CBD being approximately two-thirds as the acute angle BCD, as to the face 16.

FIGS. 3-6 show the respective four faces of the irregular tetrahedral shape more clearly, it being understood that the various views show a different face in front view as would occur if the container were rotated in 90° arcs about a vertical axis represented by the broken line 19.

From the foregoing it will be apparent that the irregular tetrahedral shape of the container 10 illustrated in FIGS. 1-6 is one wherein the six edges are comprised of edges of three different lengths. Three of the edges are shorter than the remainder and are of the same length, these being the edges AB, CD, and AD. The next longer edges consist of two which are of the same length, these being edge AC and edge BD. The longest edge of the container, of which there is only one, is the edge BC. The shortest edges of the container may be considered a unit length, and when a plurality of such containers is placed in assembled relationship within the three-dimensional area of a cube having the same unit length dimension, the containers will nest together in compact relationship in various arrangements, leaving a minimum of void area within the confines of such a cube. In any such arrangement the containers will be so oriented that each edge of unit length will extend along and constitute an edge of the cubic package assembly. Each of the two edges of intermediate length will extend along and constitute diagonal lines across a face of the cubic package, and the longest edge of the container, i.e., edge CB, will extend along and constitute a diagonal line running through the cubic package between two diagonally opposed corners thereof.

Figure 11:
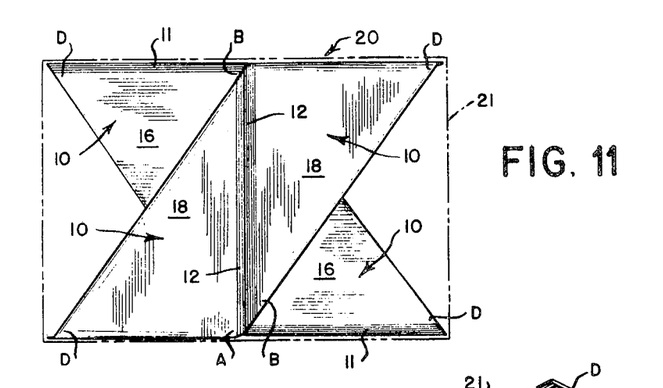
FIG. 11 is an elevational view of another embodiment of an assembled package of containers according to the within invention.
Figures 12, 13:
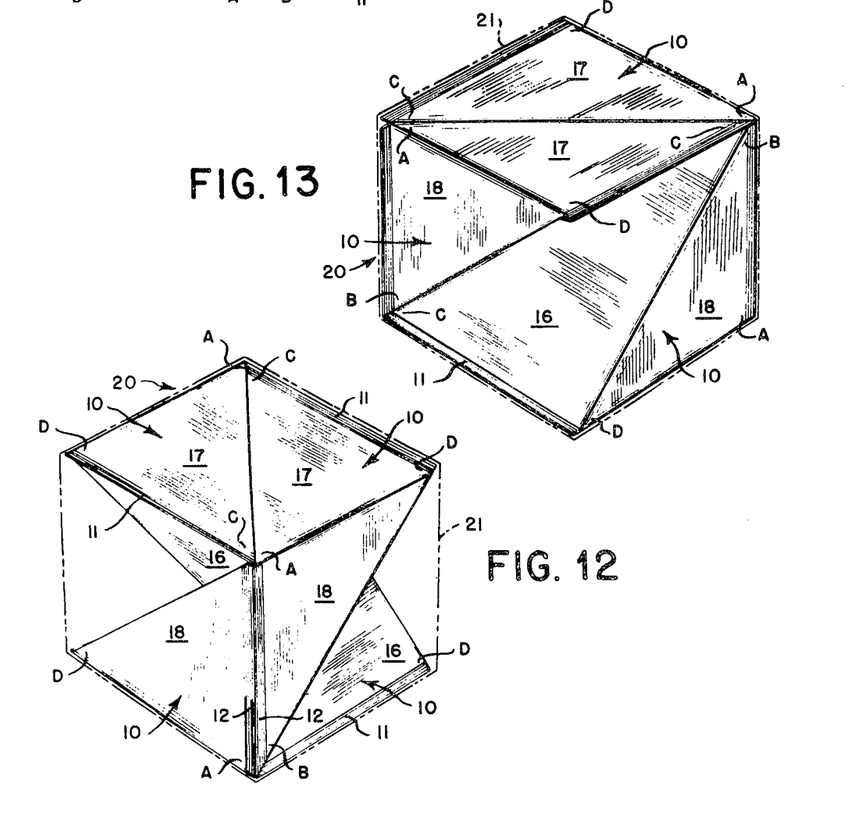
FIG. 12 is a top perspective view of the package shown in FIG. 11.
FIG. 13 is a top perspective view of said package rotated 90° about a vertical axis from the position thereof shown in FIG. 12.

In such a package arrangement, comprised of four containers 10, as illustrated in FIGS. 11-13, four of the irregularly tetrahedral shaped containers 10 are nested together within the area of a cube to constitute an assembled package 20, the cubic area bounding said package being indicated by the broken line 21. The line 21 could designate the outline of a cubic carton, overwrap, or other form of cubic enclosure, none of which, however, is considered essential to the invention herein disclosed, since the several containers could be maintained in the assembled relationship shown, if desired, by application of an adhesive at their respective interfaces, thus eliminating the need for an enclosure to maintain them in the assembled relationship.

In this package embodiment when viewed in elevation, see FIG. 11 showing two adjacent side faces of the package, it will be seen that the face 18 of one of the containers 10 constitutes the surface area equivalent to one-half of one side of the cubic area displaced, while the face 18 of another container 10 represents the surface area equivalent to one-half of the adjacent side of the cubic area thus displaced. The same package when viewed in the top perspective view of FIG. 12 shows that the top side of the package constitutes a surface area comprised of the faces 17 of two of the unit containers 10.

The package arrangement 20 of FIGS. 11–13 results in two separated voids considering the cubic area of the cube displaced by the four assembled containers 10. Each of these voids, when thus considered, assumes the shape of an irregular tetrahedron having the same cubic area of one of the containers 10. Thus it will be apparent that in the arrangement shown, the area displaced by the four containers 10 represents two-thirds of the entire area of the cube outlining said package, the void area representing one-third the area of said cube.

Figure 18:
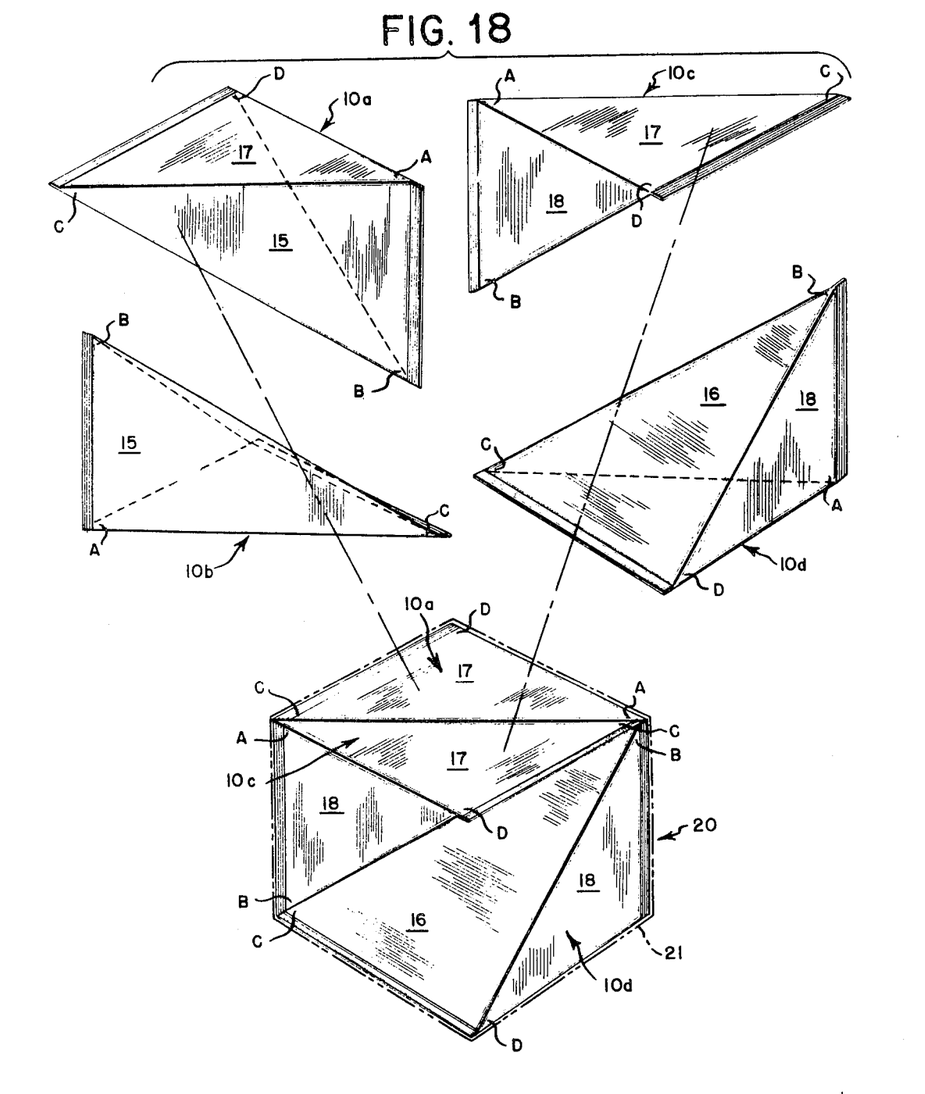
FIG. 18 is an exploded diagrammatic view showing the orientation of the containers in the package embodiment of FIGS. 11-13.

FIG. 18 further illustrates, in diagrammatic fashion, the assembled relationship of the four containers 10 assembled in the package arrangement 20 of FIGS. 11–13. In FIG. 18 the individual containers 10 have been designated with suffixes a, b, c, d to further clarify the package arrangement. In that portion of FIG. 18 showing the assembled containers in a package configuration 20, the container 10b is not visible from the angle in which the package is viewed, and it should be understood that said container 10b lies vertically beneath the container 10a, one face of the container 10b representing the rear half of the bottom side of the assembled package.

Figure 14:
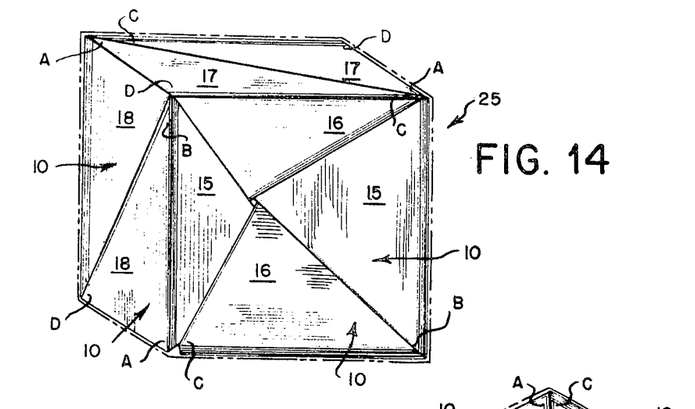
FIG. 14 is a perspective view of a still further embodiment of an assembled package of containers according to the within invention.
Figures 15, 16:
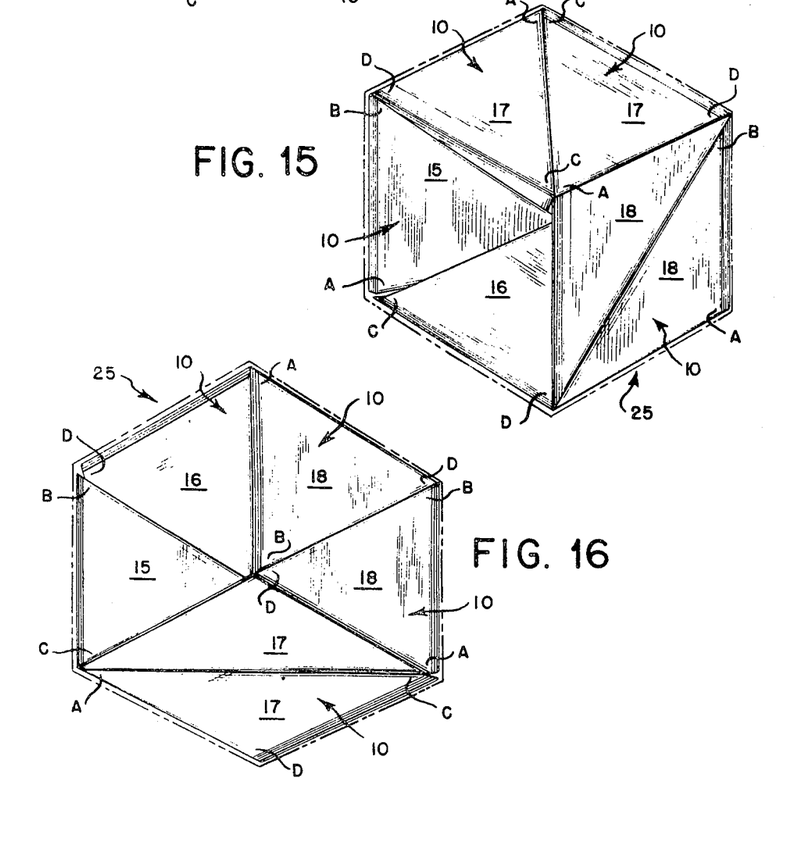
FIG. 15 is a top perspective view of the package of FIG. 14 but shown from a different angle.
FIG. 16 is a bottom perspective view showing the package rotated upwardly approximately 90° from the position thereof shown in FIG. 15.

Another arrangement of four irregular tetrahedral shaped containers 10 in a packaged configuration 25 according to the instant invention is illustrated in FIGS. 14–16. This arrangement is achieved by rotating the uppermost two unit containers of the previously described embodiment horizontally 90° removed from their position shown in the previous embodiment. In this latter arranged package 25 the top side of the cubic package is represented by faces 17 of two of the container units 10, and the bottom side of the package is represented by faces 17 of the other two container units 10 in the package. Also, two opposed sides of the cubic package are represented each by the faces 18 of two of the container units 10, the remaining two opposed sides of the package, when considering the cube in which the four container units are arranged, constitute the boundaries of a void in the form of a four-sided pyramid, the base of said pyramidal void being the entire side of the cube enclosing said containers, the four sides of each pyramidal void being represented by one-half the faces 15, 16 of the container units 10 thus assembled.

Figure 19:
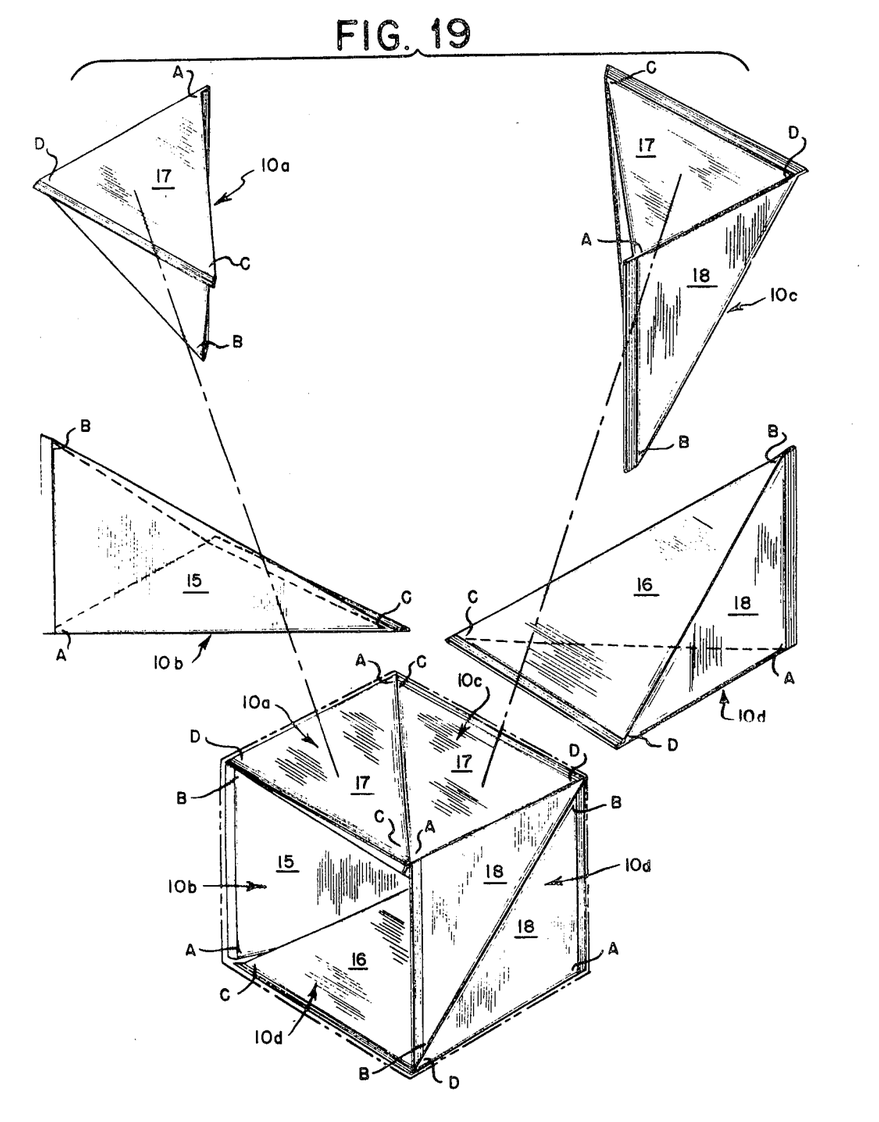
FIG. 19 is an exploded diagrammatic view showing the orientation of the containers in the package embodiment of FIGS. 14-16.

This particular orientation of the container units 10 can also be seen with reference to FIG. 19 diagrammatically illustrating the assembly and again designating the individual container units by the suffix a, b, c, d. As can be seen by comparing the arrangement of FIG. 19 with that of FIG. 18, said two lowermost container units 10b, 10d, are in exactly in the same orientation within the cubic package as was the case in the first disclosed package embodiment illustrated in FIG. 18. The top two container units, 10a, 10c, have been rotated 90° from the position shown in FIG. 18 thus altering the shape of the voids in the package from that of a tetrahedral shape to a four-sided pyramidal shape, the resultant pyramidal voids representing in effect depressions in opposite sides of the cubic package. The area of each pyramidal void, however, remains the same as the cubic area of one of the container units 10, so that in the packaged assembly diagrammatically illustrated in FIG. 19 the void space still represents one-third of the total cubic area of the entire package.

Figure 17:
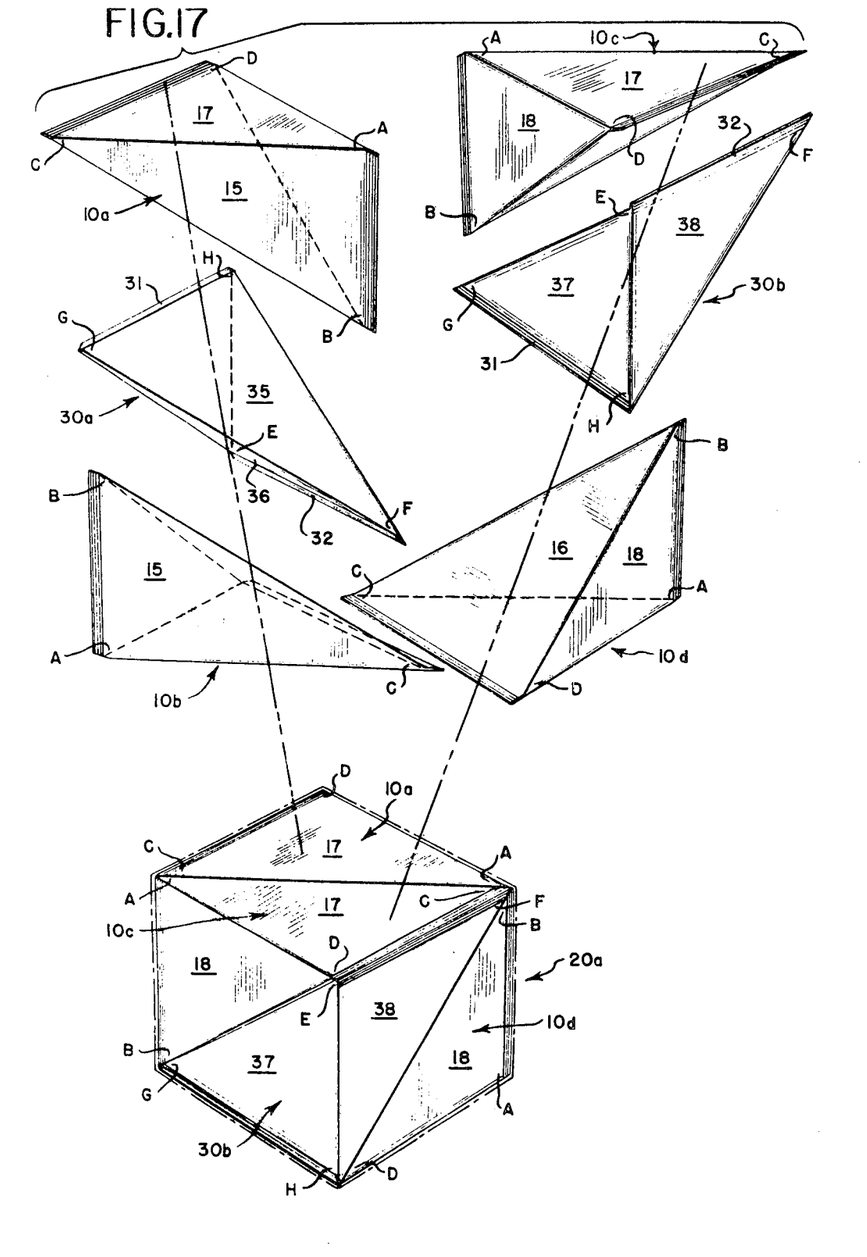
FIG. 17 is an exploded diagrammatic view illustrating the orientation of individual containers within the package embodiment of FIGS. 7–10.

FIGS. 7–10 illustrate a still further embodiment of a package 20a having the dimensions of a cube and comprised of six basic irregular tetrahedral container units. In the case of the FIGS. 7–10 embodiment package 20a, the individual or basic container units comprise four container units 10 which are arranged within the package in the identical manner as illustrated in connection with the first described package embodiment 20 illustrated in FIGS. 11–13. As mentioned in the description of said first package embodiment, the four container units 10 thus assembled displace two-thirds of the volume of the overall cube, leaving two voids each having the configuration of an irregular tetrahedron and of a cubic area equal to that of the container units 10. In the case of the FIGS. 7–10 package embodiment, the two voids of the first package embodiment are filled, each with an irregular tetrahedral container unit 30 of equal volume to the container unit 10, but symmetrical (mirror image relationship) thereto. In this latter package embodiment 20a of FIGS. 7–10 the six container units 10, 30 completely displace the volume of the overall cube, or substantially so because of the arcuate edges of the units 10 as heretofore explained, so that there is substantially no void area within the overall cube constituting the assembled package. In the event that a package configuration in the shape of a triangular prism were desired, this would be accomplished by removing three of the container units from the assembled relationships shown in FIGS. 7–10, these being three container units overlying one another and including two container units 10 and one container unit 30. This package arrangement can be seen perhaps more clearly in the diagrammatic view of FIG. 17 wherein the three container units on the left hand side of the sheet are disposed in overlying relationship within the front half of the assembled package 40 and the three container units 10, 30 extending along the right hand projection line are disposed in overlying relationship within the rearmost half of the assembled package 20a. With reference to FIG. 17, the symmetric container 30 (a or b) which may be made by a process similar to that utilized in making the containers 10, includes sealed edges 31, 32 and four vertices (trihedral angles) E, F, G and H. In the symmetric irregular tetrahedral container 30, the two larger area faces having a common hypotenuse, GF, are faces 35, 36, face 36 being defined by vertices E, F, G. The two smaller faces of the symmetric irregular tetrahedral container 30 having a leg in common are faces 37, 38, face 37 being defined by vertices E, H, G and face 38 by vertices E, H, F.

Figure 20:
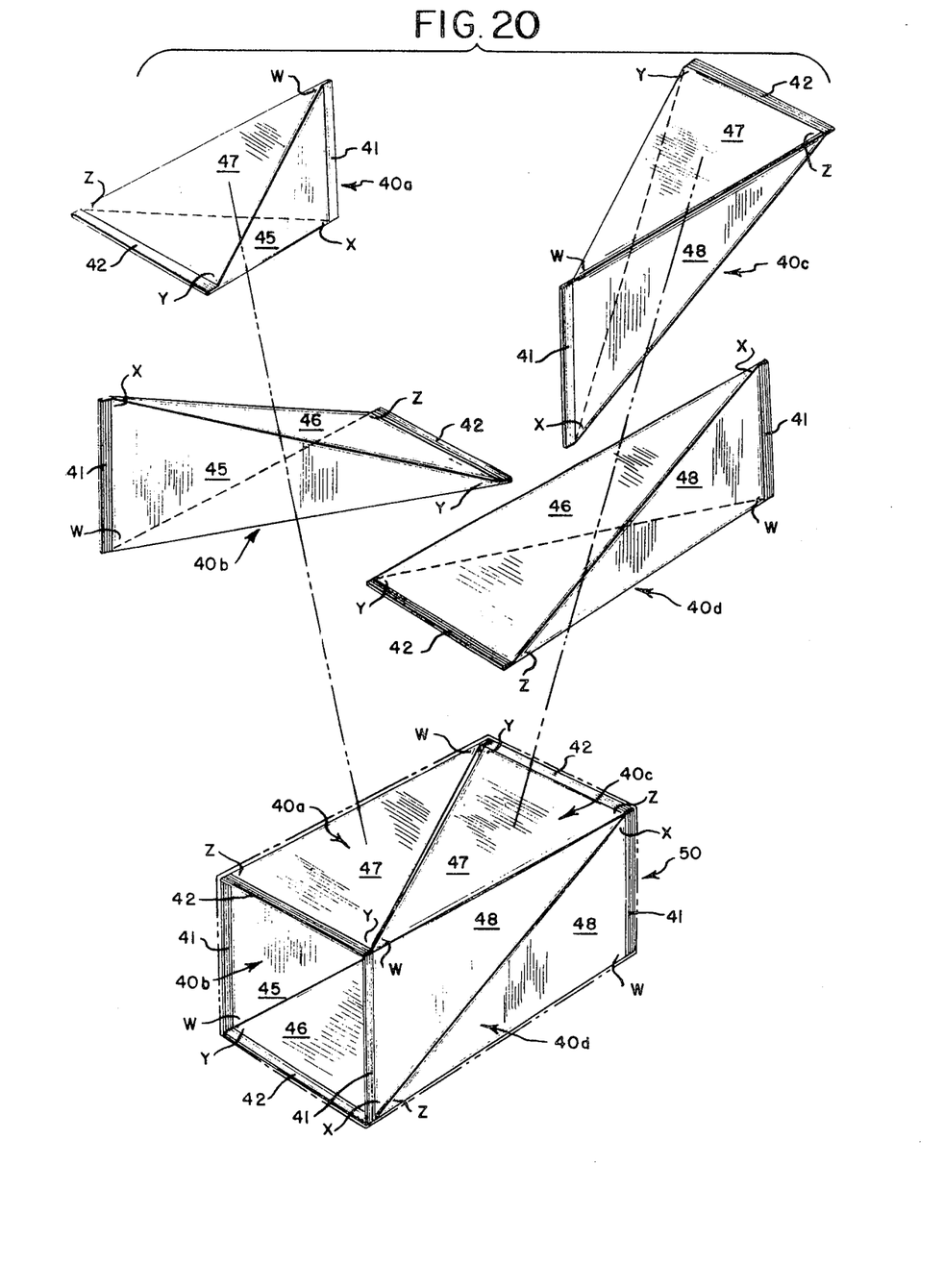
FIG. 20 is an exploded diagrammatic view illustrating the orientation of slightly modified containers in an assembled package of slightly modified shape.

In FIG. 20 is illustrated a slight further modification of the basic container unit and the resultant package configuration, the modification consisting of elongation of the basic unit to provide an irregular tetrahedral shaped container 40 (a – d) which will fit compactly into a package arrangement similar to that of FIGS. 14–16 and at 19, except that the resultant package 50 has a general outline of an elongated rectangular prism rather than that of a cube. As in the case of the container units 10, the elongated containers 40 are fabricated with two opposed sealed edges 41, 42 and four trihedral angles or vertices W, X, Y and Z. The resultant tetrahedral shaped container 40 is one having four triangualr faces 45, 46, 47, 48, each being a right triangle, but different from containers 10 in that the two smaller faces 47, 48 are not isosceles triangles but are, rather, right angle triangles of unequal sides. Four of such irregularly shaped containers 40, designated by the suffixes a, b, c, d in FIG. 20 when assembled in a manner shown diagrammatically in FIG. 20 result in an assembled package 50 which is in the general shape of a rectangular prism having voids at opposite ends thereof, each void being in the shape of a four-sided pyramid or a pentahedron the base of which represents one side of the prism. The cubic area of each void is the same as that of one of the containers 40 so that the total void space within the rectangular prism represents one-third of its volume. The particular angles in the triangular faces of containers 40 will vary in accordance with the extent of elongation. However, the relationship between the faces will remain the same as in containers 10, i.e., the two smaller area faces 47, 48 having a leg in common, the edge WZ, the two larger faces 45, 46 having a common hypotenuse represented by the edge XY.

Figure 21:
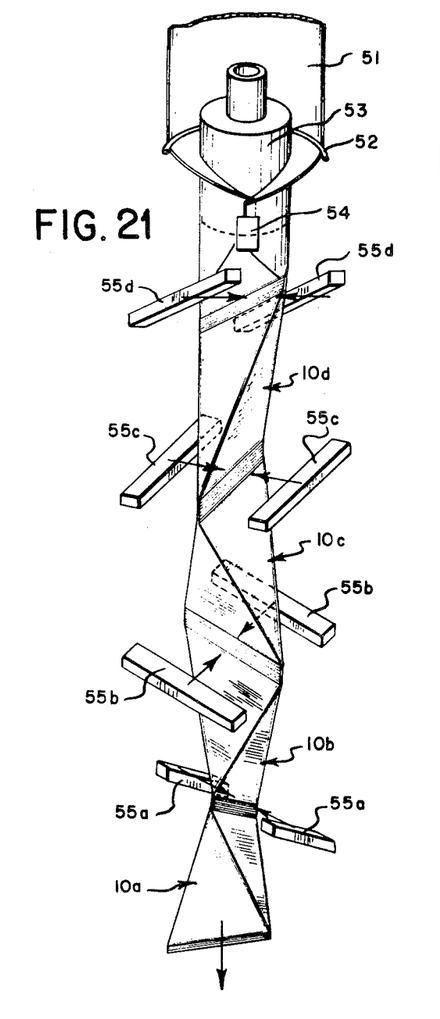
FIG. 21 is a diagrammatic view illustrating a method of making individual containers.

FIG. 21 illustrates a method of making the basic irregular tetrahedral container unit 10 and which, on slight modification of the placement of the sealing means, could also be used to make the basic container unit 40. As seen in FIG. 21, a strip of packaging material 51, which may be supplied from a roll thereof or the like, not shown, is drawn downwardly by any suitable feeding means, not shown, around a guide 52 so as to envelop a hollow mandrel 53 with the edges of the material slightly overlapping. As the material progresses down the mandrel in a substantially tubular form the overlapped edges are engaged by a sealing device 54 which acts to seal the edges to maintain the material in the tubular configuration. In the event that the packaging material includes an inner coating or lamina of a heat-sealing substance, the sealing device 54 could be a heated platen disposed to bear against the overlapping edges constituting the longitudinal seam of the material. In the event that the inner surface of the material 51 instead includes a pressure-responsive adhesive, the device 54 could be merely a pressure-applying means for achieving an overlap seam at the edges of the packaging material 51.

Disposed below the mandrel 53 are four pairs of sealing jaws 55, designated by the suffixes a, b, c, d, which jaws may be heated or not heated, as in the case of the device 54, depending upon the nature of the coating on the inner surface of the packaging material. The jaws of each pair are mounted for reciprocal motion toward and away from one another. The jaws of a pair when moved toward each other act to compress and flatten the tubular packaging material so as to adhere opposed interior surfaces of the packaging material together to achieve a seal of the tubular material along a seam line or sealing axis which intersects the longitudinal axis of the tubular material. Adjacent pairs of jaws are so oriented that they meet and effect a seal in vertical planes which are perpendicular to one another, alternate jaws of the series thus operating to achieve seals within the same vertical plane.

In order to achieve the unique irregularity of the tetrahedral shape of the container units 10, each pair of jaws is also so oriented when moving to and away from each other as to lie in a plane which has a predetermined angular relationship to the length of the tubular material so that the sealing axis of the seam achieved by each pair of jaws bears the same predetermined angular relationship to the longitudinal axis of the tubular packaging material. The longitudinal spacing of one pair of jaws from another is uniform when measured along the longitudinal axis of the tubular packaging material. In making the container units 10, the spacing between adjacent pairs of jaws is approximately one and one-quarter times the length of the seam or sealing line effected by operation of a pair of jaws. The angle of inclination between the plane in which the jaws operate and the longitudinal axis of the tubular material is, in the case of jaws 55c, 55d, approximately 24° and in the case of the jaws 55a, 55b, the 180° complement thereof or approximately 156°. It will of course be understood that each pair of jaws in effecting a seal across the tubular packaging material is making in the same operation the top sealed edge for one of the individual container units 10 and the bottom sealed edge for another of the individual container units, the tubular material being subsequently cut along approximately the median line of each seam by any suitable means, not shown, to separate the strip material into individual container units.

In operation, the tubular formed packaging material is withdrawn from the mandrel 53 to an extent at least sufficient to constitute four individual container units 10. The bottom edge of the tubular material will have been sealed by previous operation of the sealing jaws 55d. Product is then introduced into the lowermost container unit 10a shown in FIG. 1 through the bore of mandrel 63. As soon as the desired quantity of product has been introduced into the lowermost container unit 10a the sealing jaws 55a are operated to seal the top of unit 10a and the bottom of container unit 10b. Thereupon, product is introduced in the same manner into container unit 10b whereafter the sealing jaws 55b operate to seal the top of container unit 10b and the bottom of unit 10c. Product is then introduced into container unit 10c whereupon jaws 55c operate to seal the top of unit 10c and the bottom of unit 10d. Unit 10d, after being filled with product, is sealed by operation of the jaws 55d, whereupon another length of tubular material can be withdrawn and a series operation of the jaws 55a–55d will be repeated.

The method above described in relation to FIG. 21 can also be employed for making the elongated irregular tetrahedral container units 40. To achieve this latter form of irregular tetrahedral shape for the container the adjacent pairs of jaws 55 would be spaced apart a greater distance relative to the diameter of the tubular packaging material, and the angle of inclination of the respective pairs of jaws relative to the longitudinal axis of the tubular packaging material would be adjusted accordingly so that the resultant container units 40, although being elongated relative to containers 10, would nevertheless have four faces each of which constituted a right triangle.

Figure 22:
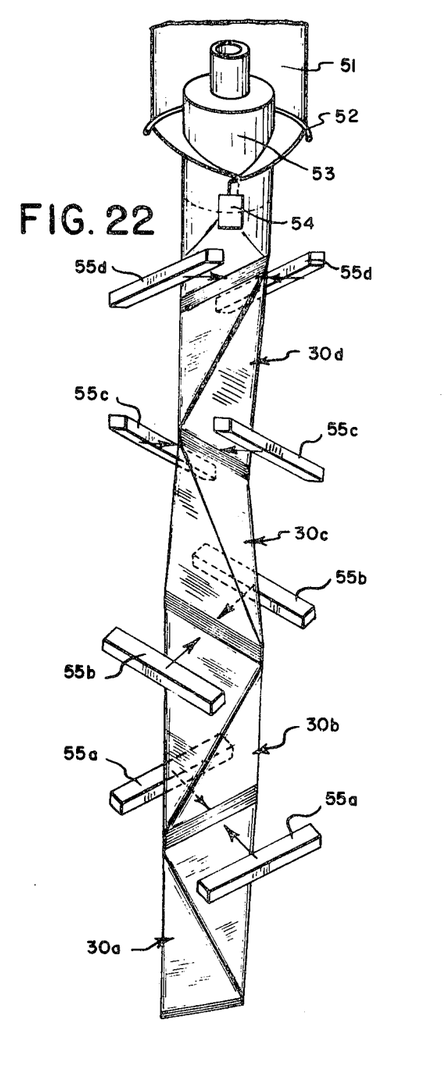
FIG. 22 is a diagrammatic view illustrating a method of making individual containers symmetrical to those made pursuant to the diagram of FIG. 21.

FIG. 22 illustrates a method by which the symmetric (mirror image) container units 30 may be made since, as heretofore described, container units 30 have the same volume as the units 10 and have four faces of the same area as those of containers 10, the relationship between the faces being reversed so as to render the containers 30 symmetric to containers 10 rather than congruent therewith. The method and means employed with respect to the symmetric containers 30, illustrated in FIG. 22, is the same as for that illustrated in FIG. 21 with the exception that the angle of inclination of two pairs of the sealing jaws, 55a, 55c, relative to the longitudinal axis of the tubular material is reversed or altered to the 180° complemental position thereof. Accordingly, in accordance with the process illustrated in FIG. 22, sealing jaws 55a are disposed to operate in a plane and effect a seal having a sealing axis disposed at approximately 24° to the longitudinal axis of the tubular material, and jaws 55c are disposed so that the angle of inclination is approximately 156°, rather than the 24° angle of the method of FIG. 21. In all other respects the process of FIG. 22 is the same as that of FIG. 21 and operates to produce container units 30 which are symmetric to those produced by the method of 21 and used in conjunction therewith in the package assembly 20a disclosed in FIG. 7-9 of the drawing, as hereinbefore fully described.

While there have been shown and described what are considered to be preferred embodiments of the invention, it of course should be understood that changes in form could obviously be made without departing from the spirit of the invention. It is therefore intended that the invention be not limited to the exact forms and features hereinabove described and shown nor to anything less than the whole of the invention as hereinafter claimed.

What is claimed and desired to be secured by Letters Patent is:

1. The method of making and filling containers formed from a continuous strip of packaging material, said containers being generally of an irregular tetrahedral shape wherein each face represents generally a right triangle, comprising the steps of forming said strip into a cylindrical tube, sealing off said tube along a first seam intersecting and lying in a plane common to the axis of said tube, said seam extending along a sealing axis deviating at a predetermined angle of inclination from normal relative to the axis of said tube, introducing product through said tube to said seam, and sealing off said tube about said product along a second seam intersecting and lying in a plane common to the axis of said tube and perpendicular to the plane of said first seam, said second seam extending along a sealing axis deviating at a predetermined angle of inclination from normal relative to the axis of said tube, the determination of said angles being such as will distort said tube into an irregular generally tetrahedral shape each face of which will constitute a right triangle.

2. The invention according to Claim 1 wherein the sealing off of said tube to effect the second seam line is spaced from the first seam line when measured along the tube axis a unit distance of approximately one and one-quarter times the length of said seam.

3. The invention according to Claim 2 wherein the sealing off of said tube to effect said second seam is made at an angle of inclination which is the 180° complement of the angle of inclination of said first seam, and including the steps of introducing product through said tube to the second seam, sealing off said tube around said latter introduced product along a third seam intersecting and lying in a plane common to the axis of said tube and perpendicular to the plane of said second seam, said third seam extending along a sealing axis deviating from normal relative to the tube axis at the same angle as said second seam and spaced the same unit distance from said second seam, introducing product through said tube to said third seam, sealing off said tube around said latter introduced product to effect a fourth seam intersecting and lying in a plane common to said tube axis and perpendicular to the plane of said third seam, said fourth seam extending along a sealing axis deviating from normal relative to the tube axis at the same angle of inclination as that of said first seam and spaced from said third seam the same said unit distance, introducing product through said tube to said fourth seam, and sealing off said tube around said latter introduced product to effect a fifth seam oriented with respect to its planes and sealing axis the same as said first seam.

4. The invention according to Claim 1 wherein the sealing off of said tube to effect the second seam line is spaced from the first seam line when measured along the tube axis a unit distance other than one and one-quarter times the length of said seam.

5. The invention according to Claim 4 wherein the sealing off of said tube to effect said second seam is made at an angle of inclination which is the 180° complement of the angle of inclination of said first seam, and including the steps of introducing product through said tube to said second seam, sealing off said tube around said latter mentioned product along a third seam intersecting and lying in a plane common to the axis of said tube and perpendicular to the plane of said second seam, said third seam extending along a sealing axis deviating from normal relative to the tube axis at the same angle of inclination as that of said second seam and spaced the same unit distance from said second seam, introducing product through said tube to said third seam, sealing off said tube around said latter mentioned introduced product to effect a fourth seam intersecting and lying in a plane common to said tube axis and perpendicular to the plane of said third seam, said fourth seam extending along a sealing axis deviating from normal relative to the tube axis at the same angle of inclination as that of said first seam and spaced from said third seam the same said unit distance, introducing product through said tube to said fourth seam, and sealing off said tube around said latter introduced product to effect a fifth seam oriented with respect to its planes and sealing axis the same as said first seam.

6. The invention according to Claim 1 wherein the sealing off of said tube to effect a second seam line is spaced from the first seam line when measured along the tube axis a unit distance of approximately one and one-quarter times the length of said seam, and wherein the sealing axes of said seams are at the same angle of inclination.

7. The invention according to Claim 6 including the steps of introducing product through said tube to the second seam, sealing off said tube around said latter mentioned product along a third seam intersecting and lying in a plane common to the axis of said tube and perpendicular to the plane of said second seam, said third seam extending along a sealing axis deviating from normal relative to the tube axis at an angle of inclination which is the 180° complement to that of said second seam and spaced the same unit distance from said second seam, introducing product through said tube to said third seam, sealing off said tube around said latter mentioned introduced product to effect a fourth seam intersecting and lying in a plane common to said tube axis and perpendicular to the plane of said third seam, said fourth seam extending along a sealing axis having the same angle of inclination as that of said third seam and spaced from said third seam the same said unit distance, introducing product through said tube to said fourth seam, and sealing off said tube around said latter introduced product to effect a fifth seam oriented with respect to its planes and sealing axis the same as said first seam.

8. The invention according to Claim 1 wherein said seams are effected by pressing against opposed sides of said tube to collapse same and bond together said opposed sides.

9. The invention according to Claim 1 wherein said seams are effected by pressing against opposed sides of said tube to collapse the tube while simultaneously heating same to bond together said opposed sides.

10. The invention according to Claim 1 including the step of cutting through each seam along its sealing axis to separate each container when filled and sealed from said tube.

* * * * *